No. 777,162. PATENTED DEC. 13, 1904.
J. H. VOLKMANN.
CANDY PULLING MACHINE.
APPLICATION FILED DEC. 3, 1903.
NO MODEL. 4 SHEETS—SHEET 1.
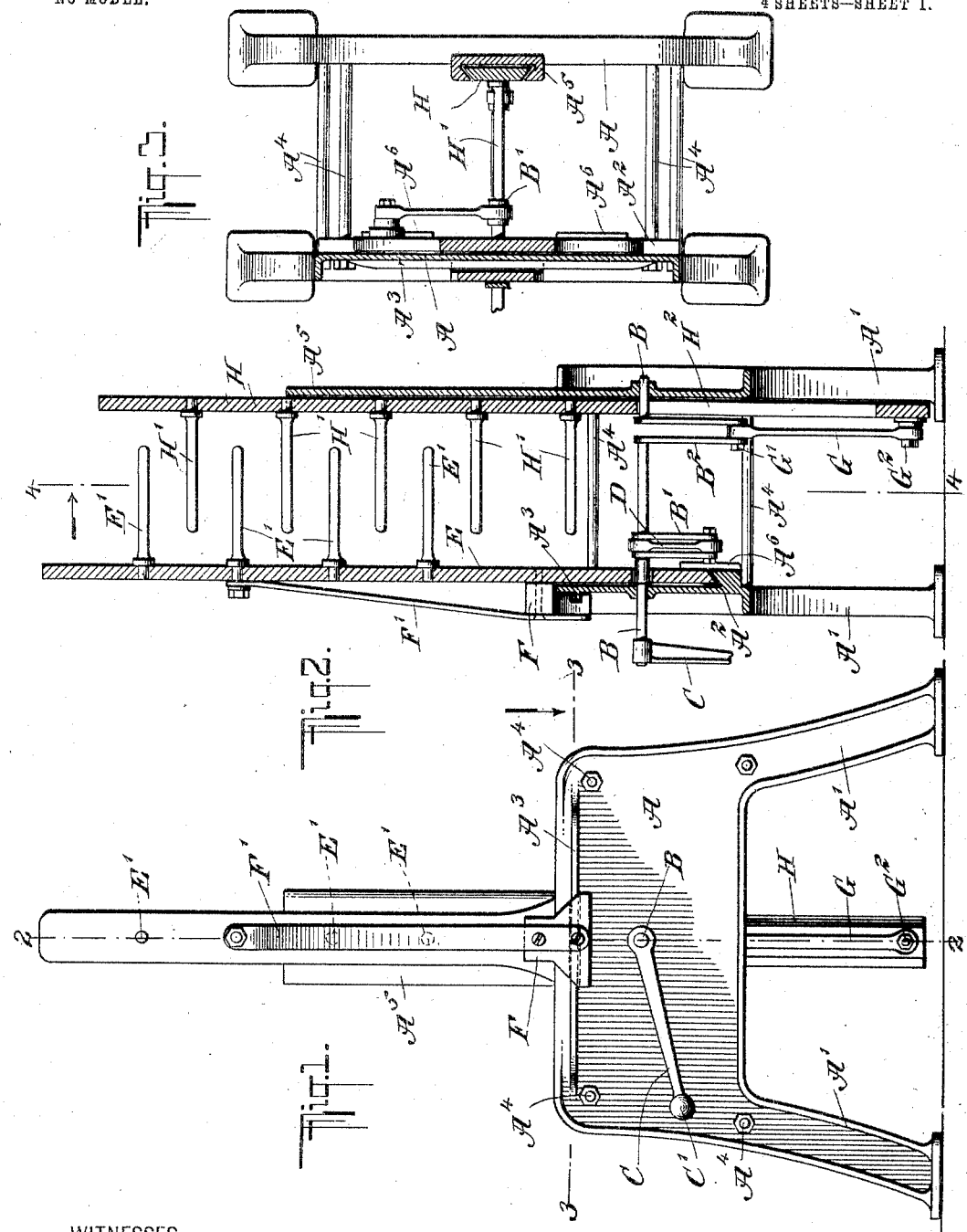
WITNESSES:
INVENTOR
John H. Volkmann
BY
Briesen & Knauth
ATTORNEYS

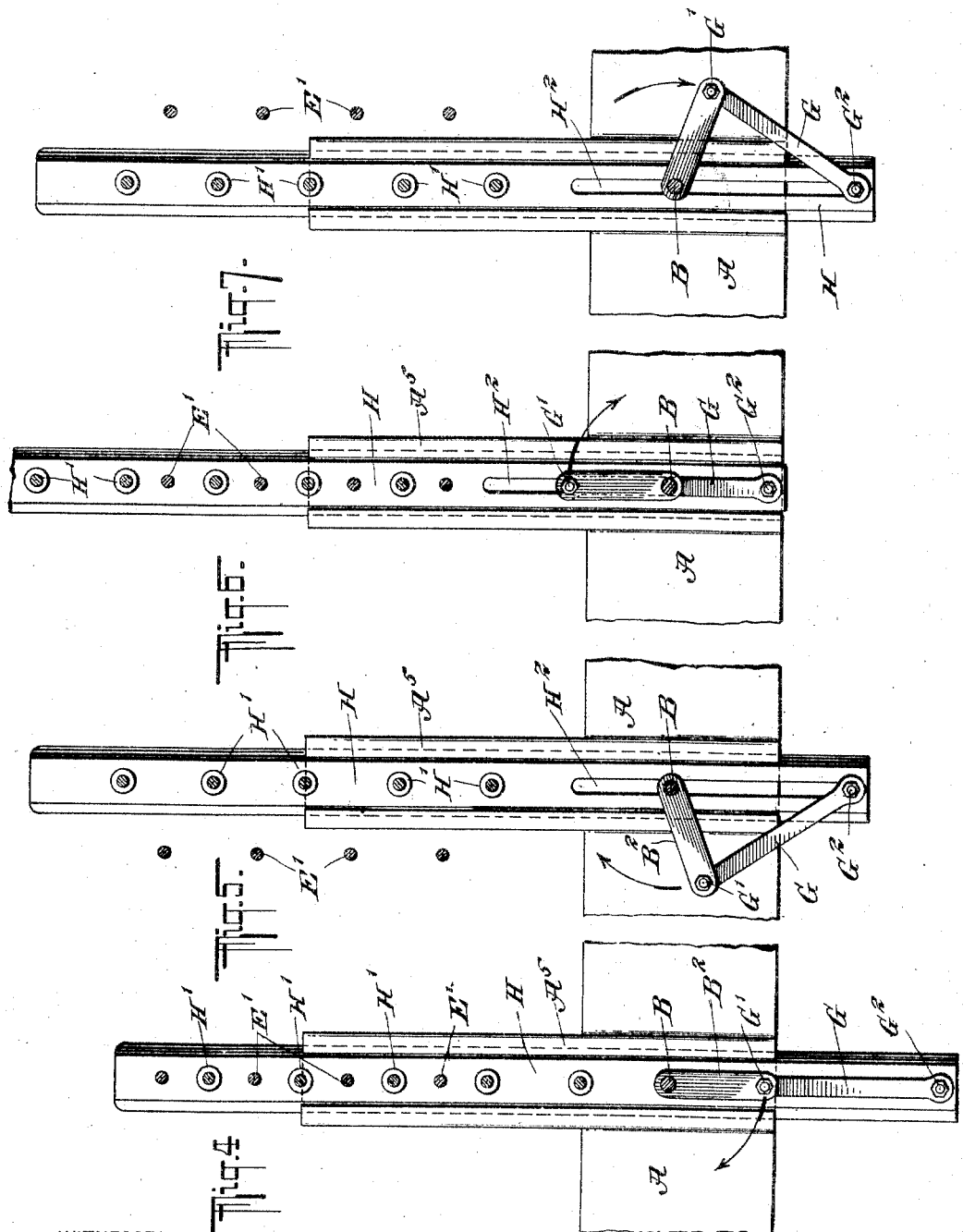

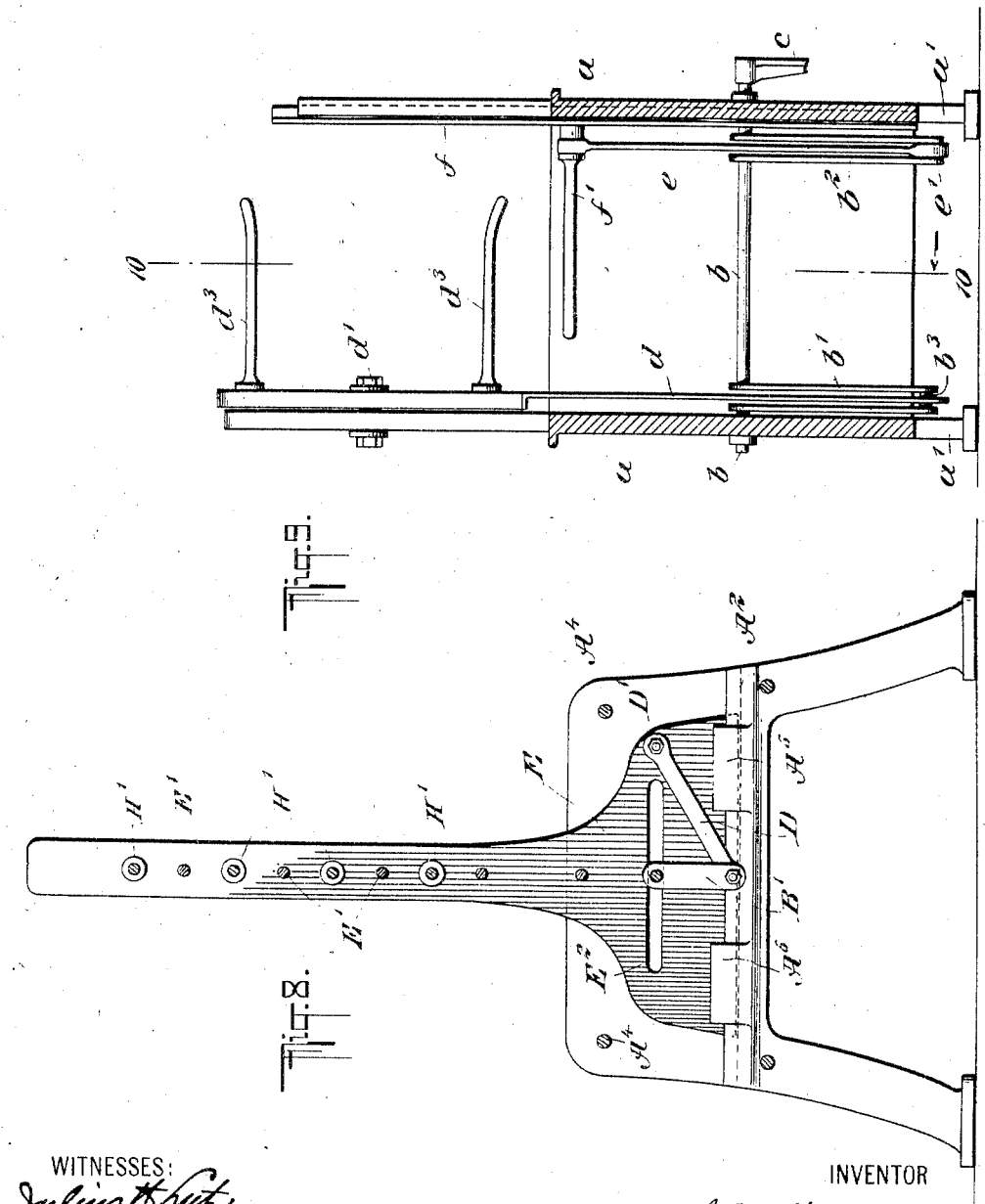

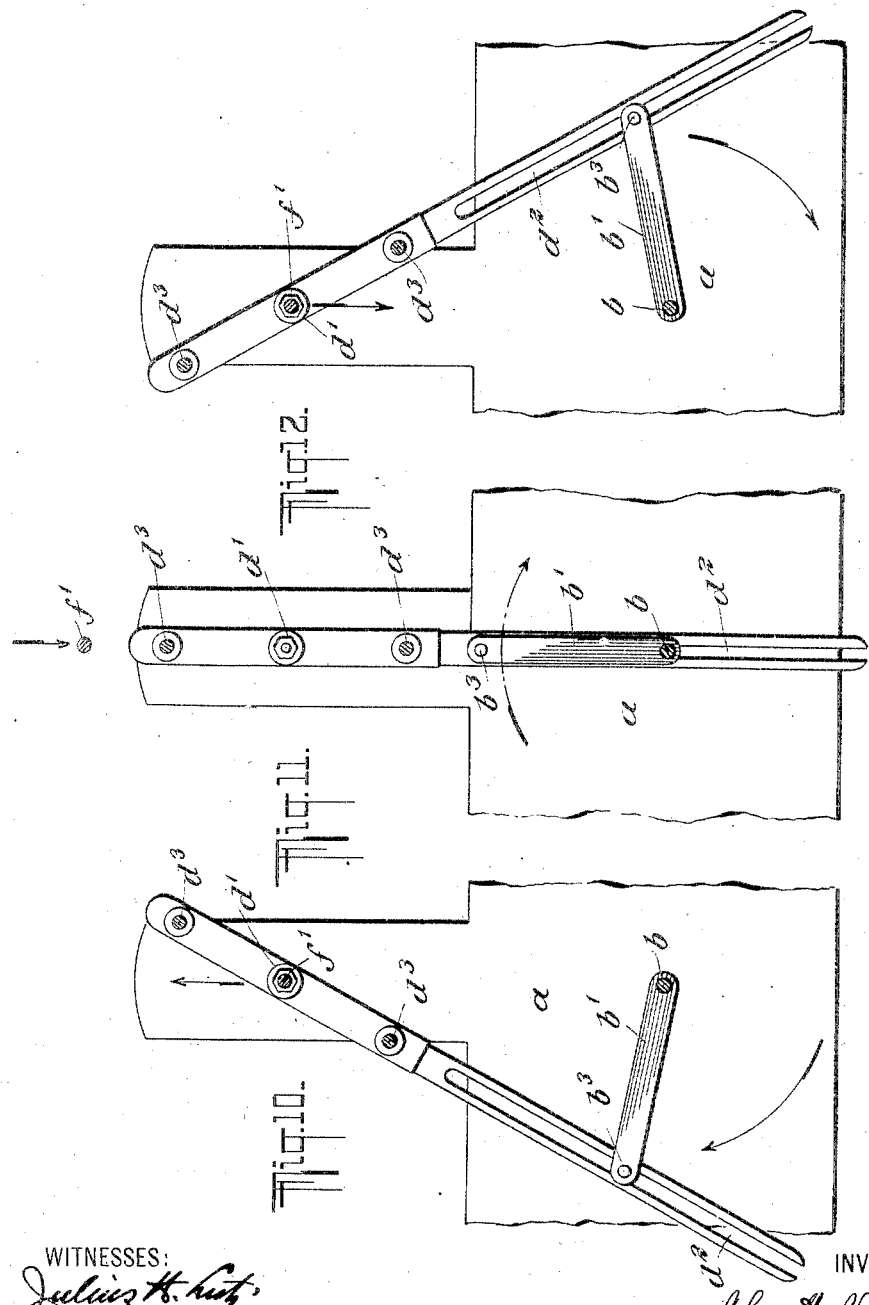

No. 777,162.

Patented December 13, 1904.

UNITED STATES PATENT OFFICE.

JOHN H. VOLKMANN, OF NEW YORK, N. Y.

CANDY-PULLING MACHINE.

SPECIFICATION forming part of Letters Patent No. 777,162, dated December 13, 1904.

Application filed December 3, 1903. Serial No. 183,557. (No model.)

*To all whom it may concern:*

Be it known that I, JOHN H. VOLKMANN, a subject of the Emperor of Germany, and a resident of the borough of Manhattan, city, county, 5 and State of New York, have invented certain new and useful Improvements in Candy-Pulling Machines, of which the following is a specification.

My invention relates to candy-pulling machines, and has for its object to provide a simple and very efficient machine of the above-indicated class.

To this end my invention consists of a candy-pulling machine having two members movable in paths at an angle to each other, the movement of each member being first in one direction and then in the opposite direction and each member having projections adapted to move in parallel lines and to take hold of a lump of the viscous mass from which candy is made.

The invention will be fully described hereinafter and the features of novelty pointed out in the appended claims.

Reference is to be had to the accompanying drawings, in which—

Figure 1 illustrates one form of my invention in front elevation. Fig. 2 is a sectional elevation on line 2 2 of Fig. 1. Fig. 3 is a sectional plan on line 3 3 of Fig. 1. Figs. 4, 5, 6, and 7 are elevations on the plane indicated by the line 4 4 of Fig. 2, showing the positions of the projections of the two members at various stages. Fig. 8 is a sectional elevation on line 4 4 of Fig. 2 looking in the opposite direction. Fig. 9 is a cross-section of another form of my invention; and Figs. 10, 11, and 12 are sectional elevations on the plane indicated by the line 10 10 in Fig. 9, illustrating different positions of the machine.

In the form of my invention illustrated by Figs. 1 to 8, inclusive, I have shown the frame A provided with legs A' and having journaled in it a shaft B, provided with a crank-arm C and handle C'. This shaft is provided with two cranked portions B' and $B^2$, one of which, B', is shorter than the other, $B^2$. At the outer end of the cranked portion B' is pivotally attached a connecting-rod D, the other end of which is pivotally connected, as at D', with a reciprocating member E, movable back and forth in a horizontal direction. This member has a series of fingers or projections E', adapted to hold a lump of candy paste. The slide E is guided at its lower end by a dovetail $A^2$ on the frame A and brackets $A^6$, as well as by the shaft B, which passes through a horizontal slot $E^2$ of the slide E. At its upper portion the slide E has a block F secured to it, which is also provided with a brace F', and this block fits over a guide-rib $A^3$ of the frame A. The cranked portion $B^2$ is pivotally connected at G' with a connecting-rod G, the other end of which has a pivotal connection at $G^2$ with a vertically-reciprocating member H, carrying a series of fingers or pins H' similar to the projections E'. The length of the projections is less than the distance between the two members or slides. In order to allow the slide H to reciprocate notwithstanding the fact that the shaft B passes through it, the said slide H has a vertical slot $H^2$. The slide is guided in any suitable manner, as by a dovetail $A^5$ of the frame A. $A^4$ are braces for the frame.

The operation will be understood best by reference to Figs. 4 to 7, inclusive. The projections H' reciprocate up and down, while the projections E' reciprocate horizontally, crossing the path of the projections H'. In Figs. 2 and 4 the slide or member H is in its lowest position and the projections H' and E' are in the same vertical plane. With the shaft B rotating in the direction indicated by the arrows the member H rises, as indicated in Fig. 5, and at the same time the projections E' move to one side. In Fig. 6 the projections H' have reached their highest position and the projections E' are again in the same vertical plane with the projections H'. The extent of the entire vertical movement of one of the projections H' is greater than the distance between two adjacent pins or projections E'. Thus the central projection H' is above the lowest projection E' in Fig. 4, while in Fig. 6 the same central projection H' is above the third pin or projection E'. As the slide H again moves downward (see Fig. 7) the projections E' pass to the other side and finally the parts return to the position shown in Fig. 4. As one set of projections thus passes between the projections of the other set, it follows that if a lump of candy-paste is put on any two or more projections of the same set the motion of the mechanism will cause this lump to be stretched and to be passed along through the entire series of projections, thus obtaining a result similar to that generally produced by manual operation, but with greater uniformity.

In the form of construction illustrated by Figs. 9 to 12, inclusive, the frame $a$, having legs $a'$, carries the shaft $b$, provided with a crank $c$ and cranked portions $b'$ $b^2$. The cranked portion $b'$ is connected at $b^3$ with a reciprocating or oscillating member $d$, fulcrumed at $d'$ and having a slot $d^2$, in which the crank-pin $b^3$ works. This reciprocating or oscillating member carries two projections $d^3$ for holding the candy paste or batch. The other cranked portion $b^2$ has a pivotal connection at $e'$ with a connecting-rod $e$, arranged to work a reciprocating member $f$, held to slide vertically in a suitable guideway of the frame $a$ and provided with a pin or projection $f'$. Fig. 9 shows the lowest position of the member or slide $f$, the pin $f'$ being in this case below the lower pin $d^3$. As the projection $f'$ rises to a point in line with the fulcrum $d'$ (see Fig. 10) the member $d$ is swung to one side, so as to bring the lower pin $d^3$ to the left and the upper pin $d^3$ to the right. When the slide $f$ reaches its uppermost position, Fig. 11, the projection $f'$ is above the upper pin $d^3$ and the three projections $f'$ $d^3$ are in the same vertical plane. The movement continuing, the projection $f'$ again descends to a central position, Fig. 12, while the member $d$ is swung in the opposite direction, so as to carry the upper pin $d^3$ to the left and the lower pin $d^3$ to the right. Finally the parts return to the position shown in Fig. 9, in which all three pins are in the same vertical line. It will be observed that in this form of my invention also the pin or projection $f'$ on one member has a movement greater than the distance between the two adjacent pins $d^3$ on the other member. While only three pins are shown, it is obvious that their number might be increased. I desire it to be understood that the term "reciprocating" as used in the appended claims is to be given a broad interpretation, so as to include an oscillating motion or any motion in which the projections travel through substantially the same path first in one direction and then in the other.

The paste or batch may be applied to the projections of fingers by the attendant, or the lowermost projection may pick up the material from a tank or receptacle.

While I have shown only two members having projections or fingers, I desire it to be understood that a greater number of such members may be employed without departing from the nature of my invention.

I desire to call particular attention to the fact that in each of the constructions illustrated the paths of all the projections carrying members, pins, or fingers lie in parallel planes, (vertical planes, as shown,) so that the distances between such planes are constant.

What I claim as new, and desire to obtain by Letters Patent, is—

1. A machine for pulling or working viscous substances, comprising two members provided with projections arranged to carry and stretch the viscous substance, said members being mounted to reciprocate rectilinearly in paths at an angle to each other and the paths of said projections lying in parallel planes.

2. A machine for pulling or working viscous substances, comprising two members provided with projections arranged to carry and stretch the viscous substance, said members being mounted to reciprocate rectilinearly at an angle to each other, the extent of the reciprocating movement of one member being greater than the distance between two adjacent projections of the other member and the paths of said projections lying in parallel planes.

3. In a machine for pulling or working viscous substances, a vertically-reciprocating member and a horizontally-reciprocating member carrying coöperating projections arranged to carry and stretch the viscous substance.

4. In a machine for pulling or working viscous substances, the combination with a frame and the shaft journaled therein, of two members mounted to slide on said frame rectilinearly and operatively connected with said shaft to receive therefrom reciprocating motions in paths at an angle to each other, said members having projections arranged to move in intersecting paths and to carry and stretch the viscous substance and the paths of said projections lying in parallel planes.

5. In a machine for pulling or working viscous substances, the combination of a frame, two opposing members movably mounted on said frame to reciprocate rectilinearly in paths at an angle to each other, said members being provided with projections extending toward the companion member and adapted to carry and stretch the viscous substance, the paths of said projections lying in parallel planes, and means for imparting motion to said members.

6. In a machine for pulling or working viscous substances, a member arranged to reciprocate rectilinearly and constructed to carry or engage the viscous substance, and another member arranged to reciprocate at an angle to the path of the first-named member and carrying a plurality of projections the distance between which is smaller than the travel of the member carrying them.

7. A machine for pulling or working viscous substances, comprising a plurality of members arranged to reciprocate rectilinearly in paths the directions of which intersect, said members having projections arranged to carry and stretch the viscous substance and the paths of said projections lying in parallel planes.

In testimony whereof I have hereunto set my hand in the presence of two subscribing witnesses.

JOHN H. VOLKMANN.

Witnesses:
 AUG. MERCKENS,
 EUGENE EBLE.